United States Patent
Reznicek

[11] 3,828,953
[45] Aug. 13, 1974

[54] TRACTOR WHEEL DOLLY
[76] Inventor: Frank Reznicek, 1412 7th St., Columbus, Nebr. 68601
[22] Filed: Oct. 5, 1972
[21] Appl. No.: 295,189

[52] U.S. Cl. ............................... 214/332, 214/333
[51] Int. Cl. ............................................. B65g 7/00
[58] Field of Search ........... 214/330, 331, 332, 333, 214/334, DIG. 4; 105/215

[56] References Cited
UNITED STATES PATENTS
| | | | |
|---|---|---|---|
| 1,570,070 | 1/1926 | Lyman | 214/332 |
| 2,364,918 | 12/1944 | Roberson | 214/333 |
| 2,852,151 | 9/1958 | Smith | 214/332 |
| 3,301,419 | 1/1967 | Molden et al. | 214/332 |

Primary Examiner—Robert G. Sheridan
Assistant Examiner—Lawrence J. Oresky
Attorney, Agent, or Firm—Clarence A. O'Brien; Harvey B. Jacobson

[57] ABSTRACT

A generally U-shaped horizontally disposed dolly including support wheels on the free ends of the leg portions of the dolly journaled for rotation about axes extending between the leg portions and an additional caster wheel assembly journaled from the mid-portion of the bight portion of the dolly extending between the base ends of the legs thereof. A pair of downwardly inclined lifting flaps are pivotally supported from the adjacent sides of the legs and are downwardly convergent and motor means is operatively connected between the U-shaped portion of the dolly at a location disposed in at least general vertical alignment with the caster wheel. The motor means is operatively connected to a vertically shiftable lifting head and downwardly divergent connecting bars are pivotally secured to opposite sides of the lifting head at their upper ends and to the free swinging adjacent lower marginal portions of the lifting flaps at their lower ends, whereby the motor means may be utilized to swing the free swinging edge portions of the flaps upwardly toward horizontal positions. In this manner, a large heavy wheel in upright position with its lower peripheral portion loosely embraced by the flaps may be engaged by the latter and lifted clear of the surface upon which the dolly is disposed.

6 Claims, 7 Drawing Figures

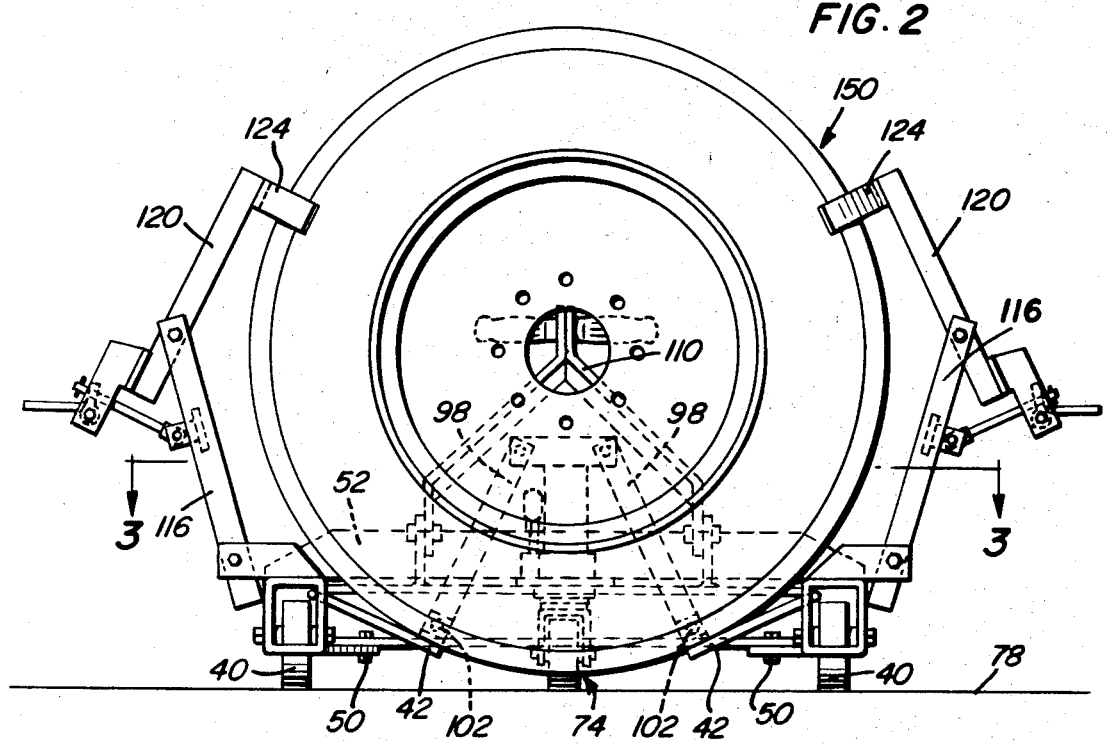
FIG. 2
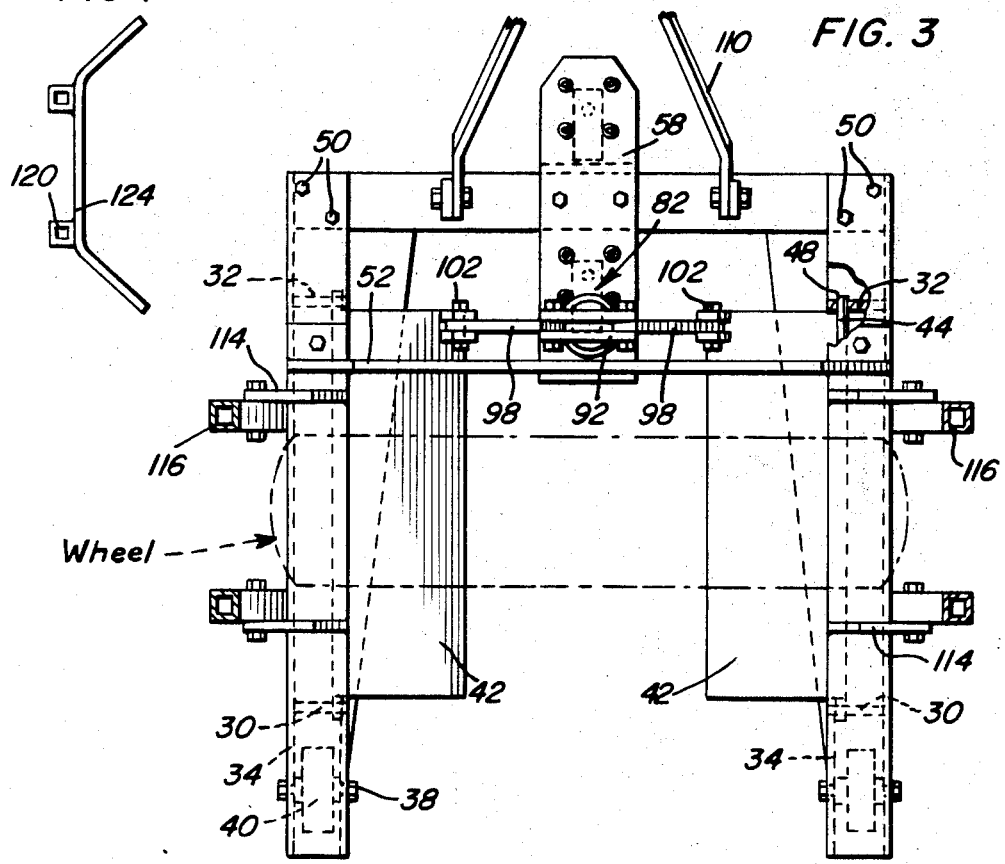
FIG. 7
FIG. 3

TRACTOR WHEEL DOLLY

When it is necessary to change a large diameter and heavy wheel such as those used on heavy road vehicles, airplanes and farm tractors, etc., the task of lifting the wheel to be mounted into position for securement to the associated hub sometimes requires as many as three to five persons. Further, if the wheel to be mounted is extremely heavy, it is not feasible for the wheel to be lifted into position by manual labor.

It is accordingly the main object of this invention to provide a dolly capable of engaging an upright wheel and lifting the wheel above the surface upon which it was disposed.

Yet another object of this invention is to provide an apparatus in accordance with the preceding object and which will be capable of not only raising and supporting a heavy large diameter wheel in elevated position but also capable of supporting the elevated wheel in a manner such that it may be readily maneuvered into precise position for mounting on an associated wheel hub.

Another very important object of this invention is to provide a wheel lifting dolly in accordance with the preceding objects and which includes pivoted handle means for assisting in ease in maneuvering the supported wheel in a horizontal plane.

A final object of this invention to be specifically enumerated herein is to provide a wheel dolly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is a front elevational view of the wheel dolly in operative association with a large diameter heavy wheel and with the wheel supported in an elevated position above the surface upon which the wheel dolly rests;

FIG. 3 is a fragmentary top plan view of the wheel dolly with portions thereof being broken away and illustrated in horizontal section and with the associated wheel removed;

FIG. 7 is an end elevational view of one of the pivoted arm portions of the wheel dolly which are utilized to maintain the supported wheel in an upright position.

Figure 1:
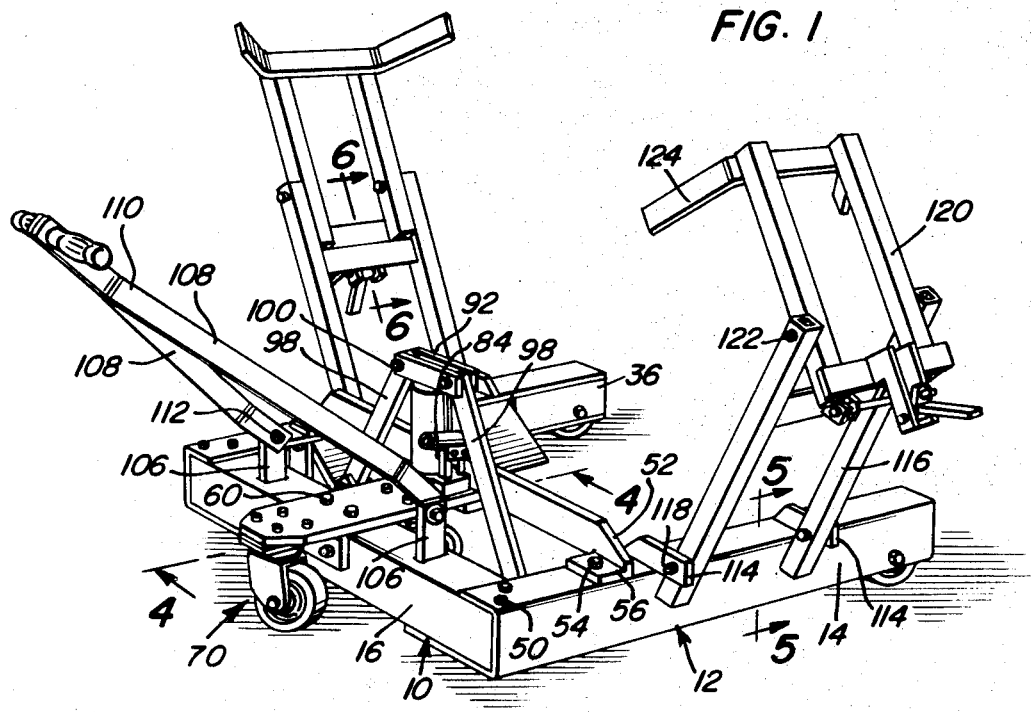
FIG. 1 is a perspective view of a wheel dolly constructed in accordance with the present invention.
Figure 4:
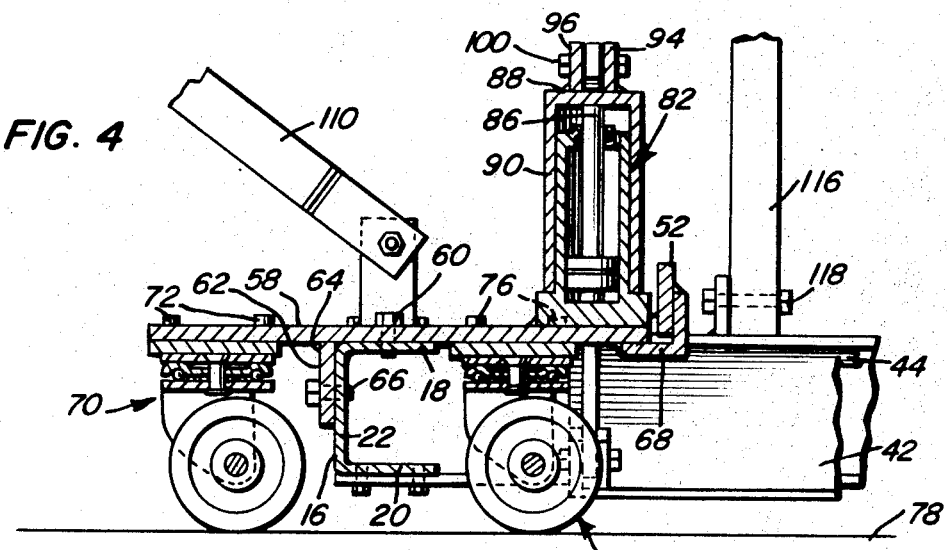
FIG. 4 is an enlarged fragmentary vertical sectional view taken substantially upon the plane indicated by the section line 4—4 of FIG. 1.

Referring now more specifically to the drawings the numeral 10 generally designates the wheel dolly of the instant invention. The dolly 10 includes a main frame referred to in general by the reference numeral 12 and the frame 12 includes a pair of generally parallel horizontal leg portions 14 interconnected at one pair of corresponding ends by means of a transverse frame or bight portion 16 extending and secured therebetween.

The bight portion 16 comprises a channel member including upper and lower flange portions 18 and 20 interconnected at their rear marginal edge portions by means of an upstanding bight portion 22 extending and secured therebetween. Each of the legs 14 also comprises a channel member consisting of upper and lower flanges 24 and 26 interconnected by means of an upstanding bight portion 28 extending and secured between the outer marginal edge portions of the flanges 24 and 26. In actual practice, the flange portions 18 and 20 and the bight portion 22 may be integrally formed and the flange portions 24 and 26 as well as the bight portion 28 may be integrally formed.

Each of the legs or channel members 14 includes front and rear partitions 30 and 32 secured between the flanges 24 and 26 and the forward end portion of the flange 26 of each leg 14 is cut away as at 34 to define a corresponding opening.

The inner sides of the forward ends of the legs 14 are closed by means of vertical flanges 36 secured between the corresponding flanges or flange portions 24 and 26 and an axle shaft 38 having a wheel 40 journaled thereon is secured between each plate or flange 36 and the corresponding bight portion 28 with the wheel 40 disposed between the plate 36 and the bight portion 28. Accordingly, the forward ends of the legs 14 are provided with support wheels.

A pair of flaps 42 are provided between the legs 14. The flaps 42 extend along the legs 14 and are downwardly convergent. The upper remote marginal edge portions of the flaps 42 have pivot rods 44 secured thereto and extending therealong and the opposite ends of the rods 42 are journaled through apertures 46 and 48 formed through the corresponding partitions 30 and 32. Thus, the remote marginal edge portions of the flaps 42 are pivotally supported from the legs 14.

Figure 5:
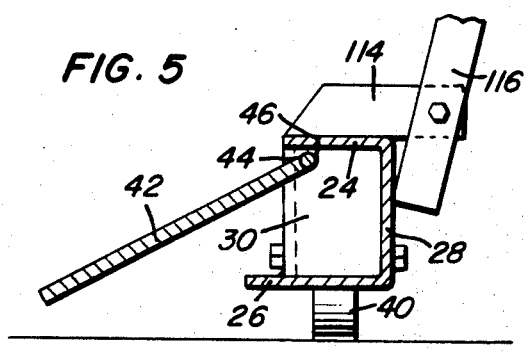
FIG. 5 is a fragmentary enlarged vertical sectional view taken substantially upon the plane indicated by the section line 5—5 of FIG. 1.

From FIGS. 2, 3 and 5 of the drawings it may be seen that the rear end portions of the flanges 36 gradually increase in width and thus that the lower flanges 26 of each leg 14 comprise bracing members for insuring that the legs 14 will be maintained in parallel relation, the rear ends of the legs 14 being secured to the opposite ends of the bight portion 16 in any convenient manner such as by rivets 50. In addition, a rear transverse member 52 is secured between the rear end portions of the legs 14 a spaced distance forwardly of the bight portion 16 and suitable fasteners such as rivets 54 are secured through opposite end horizontal flange portions 56 of the transverse brace 52 and the upper flange portions 24 of the legs 14.

An elongated front-to-rear extending mounting plate 58 is provided and is secured to the mid-portion of the flange portion 18 by means of fasteners 60 with the front and rear ends of the mounting plate projecting forwardly and rearwardly of the bight portion 16. The mounting plate 58 includes a rear depending flange 62 secured thereto by means of welding 64 and the flange 62 is secured to the rear face of the central portion of the bight portion 22 by means of a fastener 66. In addition, an L-shaped brace 68 has its horizontal flange portion secured to the forward end of the mounting plate 58 and its upstanding flange portion secured to the mid-portion of the transverse brace 52. The rear end portion of the mounting plate 58 has a first caster wheel assembly referred to in general by the reference numeral 70 secured to the underside thereof by means of suitable fasteners 72 and a second caster wheel assembly referred to in general by the reference numeral 74 is secured to the underside of the forward end portion of the mounting plate 58 by means of fasteners 76. In this manner, the frame 12 is provided with ample supporting wheels whereby the frame 12 may be readily rolled over the surface 78 upon which the various wheels thereof rest and maneuvered into precise position.

A hydraulic jack assembly referred to in general by the reference numeral 82 is mounted on the upper surface of the forward end portion of the mounting plate 58 in general vertical alignment with the front caster wheel assembly 74. The hydraulic jack assembly 82 includes an oscillatable actuator 84 as is conventional and a vertically extendable piston rod 86 secured to the undersurface of the upper end wall 88 of a downwardly opening cylindrical shield 90 which is telescoped downwardly over the upper cylindrical body portion of the hydraulic jack assembly 82. The upper end wall 88 includes a crosshead 92 comprising a pair of spaced transverse bars 94 and 96 secured to the upper surface of the end wall 88 and the upper ends of a pair of downwardly divergent connecting bars 98 are pivotally secured between corresponding ends of the bars 94 and 96 by means of suitable pivot fasteners 100. The lower ends of the connecting bars 98 are pivotally secured, as at 102 to the adjacent rear corners of the flaps 42. Accordingly, operation of the hydraulic jack assembly 82 to upwardly extend the piston rod 86 results in the free swinging edge portions of the flaps 42 being swung upwardly away from the surface 78.

Figure 6:
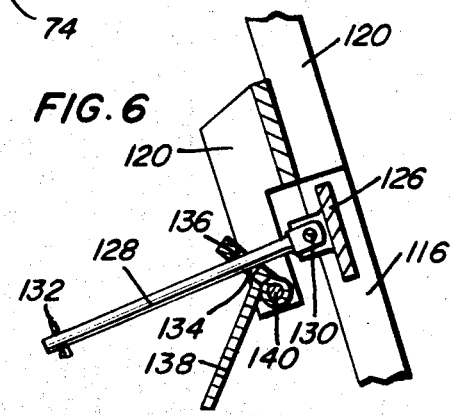
FIG. 6 is a fragmentary vertical sectional view taken substantially upon the plane indicated by the section line 6—6 of FIG. 1.

A pair of upstanding mounting brackets 106 are secured to and project upwardly from the opposite end portions of the upper flange portion 18 and the downwardly divergent lower ends of the arms 108 of a handle assembly 110 are pivotally secured to the brackets 106 as at 112. Still further, each of the legs 14 includes a pair of longitudinally spaced transverse mounting brackets 114 secured to the upper surface of the flange portion 24 thereof and the lower ends of the legs of an H-shaped frame 116 are pivotally secured to the brackets 114 as at 118. Still further, a pair of upstanding swing arms 120 have their lower ends pivotally secured between corresponding pairs of upper ends of the legs of the frames 116 by means of pivot fasteners 122 and the upper end portions of the swing arms 120 include generally U-shaped cradle members 124 opening toward each other. Also, the crossbar 126 of each H-shaped frame 116 has one end of a slide bar 128 pivotally secured thereto as at 130, see FIG. 6. The opposite end of the slide bar 128 is provided with an abutment 132 and the intermediate portion of the slide bar 128 is slidingly received through a somewhat enlarged aperture 134 formed through one leg 136 of a bell crank 138 pivotally supported from the corresponding swing arm 120 as at 140. Accordingly, inasmuch as the bell cranks 138 are eccentrically weighted, the edges of the apertures 134 are frictionally engaged with the slide bars or rods 128 to maintain the latter in adjusted longitudinally shifted positions relative to the leg or flange 136 of the corresponding bell crank 138.

In operation, and assuming that the hydraulic jack assembly 82 is fully retracted so that the free swinging edge portions of the flanges 42 will be only slightly spaced above the floor surface 78, the dolly 10 is advanced toward a large diameter heavy wheel such as that generally designated by the reference numeral 150 in FIG. 2 of the drawings while the wheel 150 is resting in an upright position on the floor surface 78. After the dolly 10 has been positioned so that the lower peripheral portions of the wheel 150 are received between the flaps 142, the swing arms 120 may be brought into position so as to loosely embrace the upper marginal portions of the wheel 150 in the manner illustrated in FIG. 2 of the drawings and thereafter the hydraulic jack assembly 82 may be actuated to raise the free swinging edge portions of the flanges 42. In this manner, the free swinging edge portions of the flaps 142 will be brought into contact with the lower peripheral portions of the wheel 150 and lift the wheel 150 from the surface 78 while the cradle members 124 of the swing arms 120 maintain the wheel 150 in an upright position. After the wheel 150 has been lifted above the surface 78, the dolly 10 may be utilized to transport the supported wheel 150 to the vehicle upon which it is to be mounted. Then, after the wheel has been properly horizontally positioned for securement to the associated wheel hub, final adjustment in the elevation of the wheel 150 may be carried out by operation of the hydraulic jack assembly 82 so that the wheel 150 will be precisely positioned for securement to the associated wheel hub.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wheel dolly for heavy, large diameter wheels, said dolly including a generally horizontal frame having opposite side elongated longitudinal members interconnected at their rear end portions by means of an elongated transverse member extending and secured therebetween, the front end portions of said longitudinal members being free of bracing members extending therebetween and defining an entrance passageway through which the lower periphery of an upright wheel is received upon the frame being forwardly advanced toward the wheel in an axial direction, said longitudinal members including flap-type structures extending therealong and projecting laterally outwardly of said longitudinal members toward each other, means oscillatably supporting the flap-type structures from said longitudinal members for swinging about axes generally paralleling said longitudinal members and adjacent the remote edges of said flap-type structures, and force means connected between the adjacent free swinging edge portions and said frame operative to simultaneously swing said flap-type structures to elevate the adjacent free swinging marginal edges thereof, each of longitudinal members including an upwardly and outwardly inclined frame, an elongated upwardly and inwardly inclined swing arm pivotally mounted, intermediate its opposite ends, to the free upper end portion of each of said frames for oscillation about an axis generally paralleling said longitudinal members, the upper free ends of said swing arms including cradle members opening toward each other for engaging, embracing and supporting an adjacent peripheral portion of a tire, means connected between each swing arm and the corresponding inclined frame operative to releasably secure said swing arms in adjusted oscillated positions relative to said frames, said upwardly and outwardly inclined frames being pivotally supported at their lower ends from said elongated longitudinal members for oscillation relative thereto about axes extending longitudinally of said longitudinal members, said inclined frames and said longitudinal members including coacting means limiting angular displacement of said inclined frames to swing the upper ends thereof away from each other.

2. The combination of claim 1 wherein said force means comprises an upright hydraulic jack with its base supported from a mid-portion of said transverse member and including a head on the upper end portion of the vertically extendable portion thereof.

3. The combination of claim 2 including elongated upstanding connecting bars disposed in downwardly divergent relation and having their upper ends pivotally secured to said head, the lower ends of said bars being pivotally secured to the free marginal edge portions of said flap-type structures.

4. The combination of claim 1 wherein said transverse member includes a laterally and forwardly projecting intermediate mounting portion, said force means being supported from the forward portion of said mounting portion, a caster wheel assembly underlying and supporting said forward portion, the forward ends of said longitudinal members including ground engaging wheel means journaled for rotation about transverse axes.

5. The combination of claim 4 wherein said intermediate mounting portion also includes a laterally and rearwardly projecting portion, and a second caster wheel assembly underlying and supported from said laterally and rearwardly projecting portion.

6. The combination of claim 1 wherein said transverse member includes a centrally disposed elongated handle having one end pivotally supported from said transverse member for oscillation about an axis extending longitudinally of said transverse member and horizontally transversely of said handle.

* * * * *